United States Patent [19]

Takase et al.

[11] Patent Number: 4,987,303

[45] Date of Patent: Jan. 22, 1991

[54] MICRO-DISPLACEMENT DETECTOR DEVICE, PIEZO-ACTUATOR PROVIDED WITH THE MICRO-DISPLACEMENT DETECTOR DEVICE AND SCANNING PROBE MICROSCOPE PROVIDED WITH THE PIEZO-ACTUATOR

[75] Inventors: Tsugiko Takase, Tokyo; Hideo Adachi, Iruma; Takao Okada, Tokyo; Hisanari Shimazu, Tokyo; Hideo Tomabechi, Tokyo, all of Japan

[73] Assignee: Olympus Optical Co., Inc., Tokyo, Japan

[21] Appl. No.: 504,538

[22] Filed: Apr. 4, 1990

[30] Foreign Application Priority Data

Apr. 7, 1989 [JP] Japan .................................... 1-88731

[51] Int. Cl.⁵ .............................................. H01J 37/26
[52] U.S. Cl. ...................................... 250/306; 73/105; 324/662
[58] Field of Search ................... 250/306, 307; 73/105; 324/662

[56] References Cited

U.S. PATENT DOCUMENTS

| | | | |
|---|---|---|---|
| 2,715,830 | 8/1955 | Lewis et al. | 73/105 |
| 4,560,924 | 12/1985 | Nordberg | 73/105 |
| 4,883,959 | 11/1989 | Hosoki et al. | 250/306 |

Primary Examiner—Jack I. Berman
Attorney, Agent, or Firm—Frishauf, Holtz, Goodman & Woodward

[57] ABSTRACT

A scanning tunnel microscope includes a piezo-actuator movable in a direction Z perpendicular to the surface of a sample and provided with a scanning probe projected downward from the bottom thereof. The scanning probe is moved in the direction Z by the piezo-actuator. The piezo-actuator includes a position measuring probe projected therefrom, parallel to the surface of the sample, from the lower end of one side thereof. A reference sample having concaves formed on a surface thereof at predetermined intervals is fixed to the piezo-actuator. When the scanning probe is moved in the direction Z, the position measuring probe is moved along the reference sample, so that tunnel current having a waveform which reproduces the shape of the concaved surface of the reference sample is detected. Thus, the moving distance of the scanning probe can be obtained from the waveform of tunnel current detected.

8 Claims, 6 Drawing Sheets

MICRO-DISPLACEMENT DETECTOR DEVICE, PIEZO-ACTUATOR PROVIDED WITH THE MICRO-DISPLACEMENT DETECTOR DEVICE AND SCANNING PROBE MICROSCOPE PROVIDED WITH THE PIEZO-ACTUATOR

BACKGROUND OF THE INVENTION

1. Field of the Invention

The present invention relates to a micro-displacement detector device and, more particularly, a device for detecting the displacement of a probe, which device is used by the scanning probe microscope such as the scanning tunnel microscope (which will be hereinafter referred to as STM) and the atomic force microscope (which will be hereinafter referred to as AFM).

2. Description of the Related Art

In the case of the scanning probe microscope such as STM and AFM, the displacement of the probe relative to a sample is indirectly measured by detecting tunnel current flowing between the sample and the probe or atomic force acting between them.

These STM and AFM employ mainly a piezo-actuator to slightly move the probe. The piezo-actuator includes a piezo-element body and plural drive electrodes arranged round the piezo-element body. When the piezo-element body is expanded or contracted by voltage applied to the drive electrodes, the probe fixed to the piezo-actuator is moved slightly or on micro-basis. The position of the probe (or the amount of expansion and contraction of the piezo-actuator) can be therefore obtained in this case from the voltage applied to the drive electrodes.

Figure 7:
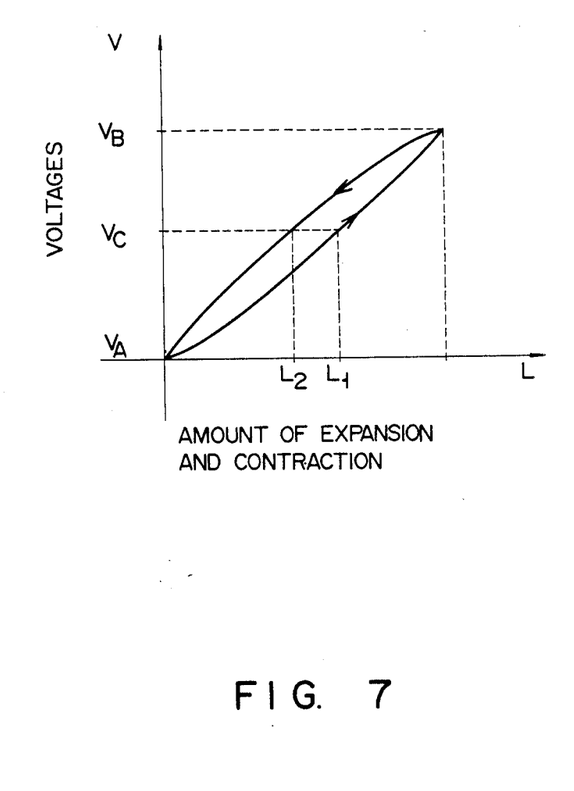
FIG. 7 is a graph showing the relation between voltage applied to electrodes and the amount of expansion and contraction of the piezo-actuator.

It is however difficult to accurately determine the position of the probe from the voltage applied to the drive electrodes. One of the reasons resides in that the piezo-actuator moves not linearly but with hysteresis by the voltage applied to the drive electrodes, as shown in FIG. 7. In short, the piezo-actuator cannot return accurately to its original position even when voltage is stopped after it is applied to the drive electrodes. Another reason is that the piezo-actuator has creep phenomenon, when voltage is applied to the drive electrodes for a long time, therefore, the relation between the voltage applied and the amount of expansion and contraction of the piezo-actuator becomes out of order. A further reason resides in that when the probe comes quite near the surface of a sample, atomic force acts between the probe and the sample to separate the probe from the surface of the sample. As the result, the proportional relation between the voltage applied and the amount of expansion and contraction of the piezo-actuator is broken.

As described above, it is difficult to accurately measure the position (or displacement) of the probe on the basis of voltage applied to the drive electrodes for the piezo-actuator. It is therefore difficult for this piezo-actuator to measure micro-displacements on atomic basis.

SUMMARY OF THE INVENTION

The object of the present invention is therefore to provide a micro-displacement detector device capable of accurately detecting micro-displacements, a piezo-actuator provided with this micro-displacement detector device and a scanning probe microscope provided with this piezo-actuator.

According to the present invention, a micro-displacement detector device comprises a reference sample having a face of which property changes along the face, a probe located adjacent to the reference sample and moved along the face of the reference sample, and means for detecting the displacement of the probe relative to the face of the reference sample.

A piezo-actuator of the present invention comprises a piezo-element body, a pair of electrodes which hold the piezo-element body between them wherein the piezo-element body is expanded or contracted in a predetermined direction when voltage is applied between the electrodes, and a micro-displacement detector device which includes a reference sample having a face of which property changes along the face, a probe located adjacent to the reference sample and moves along the face of the reference sample, and means for detecting the displacement of the probe relative to the face of the reference sample.

A scanning probe microscope according to the present invention comprises a first probe for observing the surface of a sample, one or more second probes extending in a direction perpendicular to the first probe, a piezo-actuator for supporting the first and second probes and moving them in a direction vertical to the surface of the sample without changing their positional relation, a reference sample having a face on which concaves and convexes are formed at predetermined intervals and supported with this face directed perpendicular to the second probe, means for applying bias voltage between the first probe and the sample to detect tunnel current flowing between them, and means for applying bias voltage between the second probe and the reference sample to detect tunnel current flowing between them so as to measure the displacement of the first probe on the basis of the concaves and convexes on the face of the reference sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A case where a micro-displacement detector device of the present invention and a piezo-actuator provided with the micro-displacement detector are applied to STM will be described with reference to the drawings.

Figure 1:
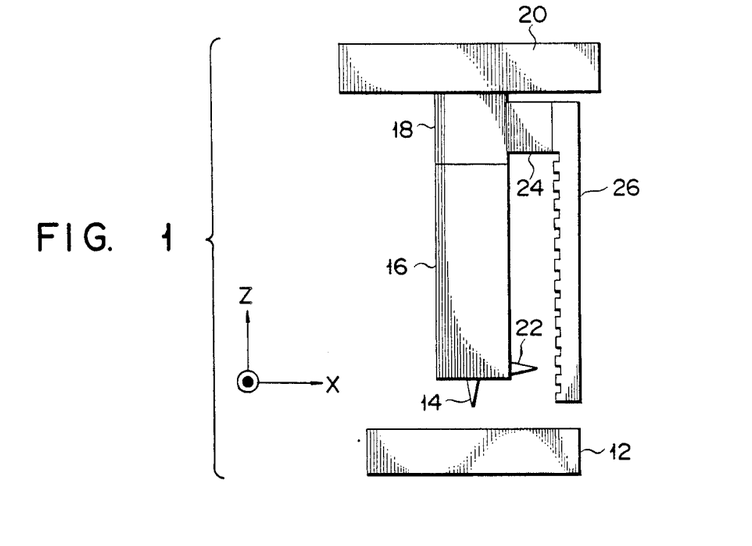
FIG. 1 shows an embodiment of the piezo-actuator provided with a micro-displacement detector device according to the present invention.

As shown in FIG. 1, a probe 14 for scanning the surface of a sample 12 is attached to the underside of first piezo-actuator 16 which is expanded or contracted to move in a direction (or direction Z) perpendicular to the surface of the sample 12. The first piezo-actuator 16 is a rectangular parallelepiped such as PZT provided with plural drive electrodes (not shown) at its four sides and when voltage is applied to these drive electrodes, the piezo-actuator 16 is expanded or contracted at a rate of 1 nm/V, for example. As the result, the scanning probe 14 is slightly moved in the direction Z of a coordinate system shown in FIG. 1. The top of the first piezo-actuator 16 is fixed to an X - Y drive system 20 through a holder member 18 and the whole of the first piezo-actuator 16 is moved parallel to the surface of the sample 12 by the X - Y drive system 20. When the first piezo-actuator 16 is driven together with the X - Y drive system 20, the scanning probe 14 can be moved in a three-dimensional direction.

The first piezo-actuator 16 has a position measuring probe 22 projected from the lower end of a side thereof in a direction perpendicular to the scanning probe 14. It is more preferable that the scanning and position measuring probes 14 and 22 are fixed to the first piezo-actuator 16 through solid members so as to keep the positional relation of these probes 14 and 22 not influenced by the expansion and contraction of the first piezo-actuator 16. A reference sample 26 having concaves formed at a predetermined interval in that face thereof which is opposed to the position measuring probe 22 is fixed to the holder member 18 through a second piezo-actuator 24 in such a way that bottoms of these concaves cross at right angle the direction in which the position measuring probe 22 extends and has a predetermined distance relative to a plane on which the tip of the position measuring probe 22 is positioned. The concaves and convexes formed on the face of the reference sample 26 have therefore a certain pitch in the vertical direction. They may be grooves formed at a pitch of 1 μm according to the IC manufacturing technique or concaves and convexes of atoms on a crystal surface of graphite. The second piezo-actuator 24 has electrodes (not shown) and the distance between the tip of the position measuring probe 22 and the reference sample 26 can be adjusted responsive to voltage applied to these electrodes of the second piezo-actuator 24.

Figure 2:
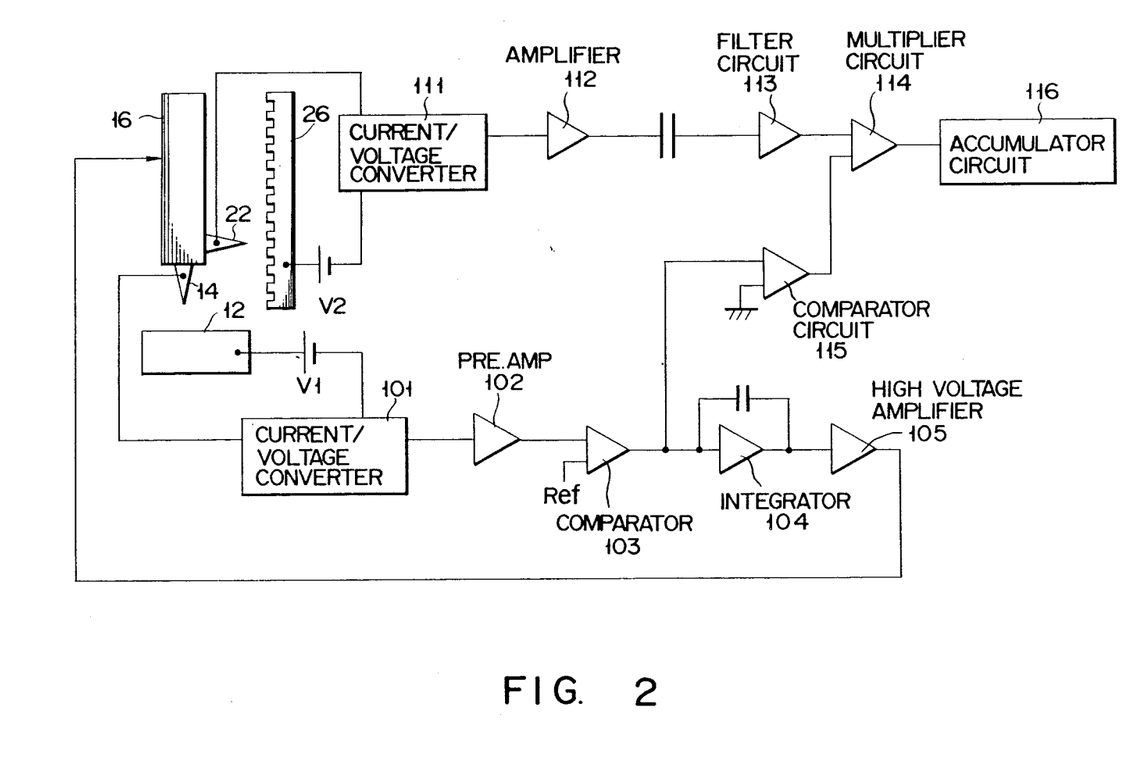
FIG. 2 shows feedback control and position measuring circuits to drive the piezo-actuator shown in FIG. 1.

Measurement under STM constant-current mode will be described wherein the scanning probe 14 scans the sample 12 along the surface thereof while keeping its distance relative to the surface of the sample 12 certain. FIG. 2 shows a circuit for controlling the distance of the scanning probe 14 relative to the sample 12 and a circuit for measuring the position of the scanning probe 14 in the direction Z.

The scanning probe 14 is controlled under STM constant-current mode by the feedback control circuit to move keeping its distance relative to the surface of the sample 12 certain. Bias voltage is applied between the scanning probe 14 and the sample 12 by a power source V1 so that tunnel current flows between them. This tunnel current is converted to voltage by a current-/voltage converter 101 and the voltage thus converted is amplified by a preamplifier 102. Signal output from the preamplifier 102 is input to a positive input terminal of a comparator 103 and compared with reference voltage input to a negative input terminal of the comparator 103. Differential signal is thus output. This differential signal is divided into two, one of which is input to and integrated by an integrator 104 and the other to a comparator circuit 115 where its polarity is checked. The differential signal integrated by the integrator 104 is amplified by a high voltage amplifier 105 and then applied to the drive electrodes of the first piezo-actuator 16. The scanning probe 14 is thus moved not to change its distance relative to the sample 12, thereby keeping the distance between the scanning probe 14 and the sample 12 certain.

More specifically, voltage which is reverse in polarity and which corresponds to a difference between the tunnel current flowing between the scanning probe 14 and the sample 12 and a value of the reference voltage is applied to to the first piezo-actuator 16 and the scanning probe 14 is feedback-controlled to keep certain its distance relative to the sample 12. The scanning probe 14 is moved along the surface of the sample 12 in the direction X - Y while keeping certain its distance relative to the surface of the sample 12.

Figure 3A:
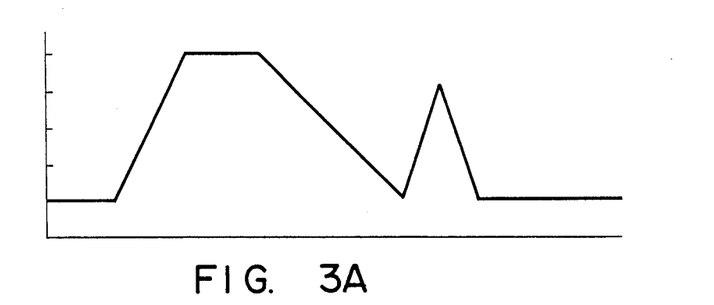
FIGS. 3A to 3E are intended to explain the operation of the circuits shown in FIG. 2.
Figure 3B:
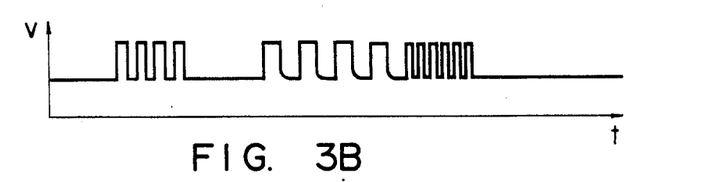
Figure 3C:
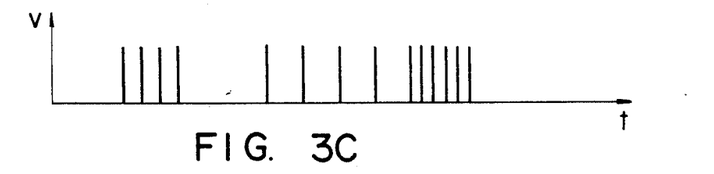
Figure 3D:
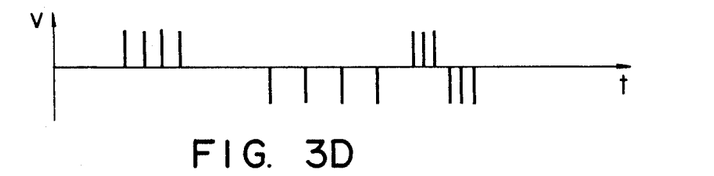
Figure 3E:
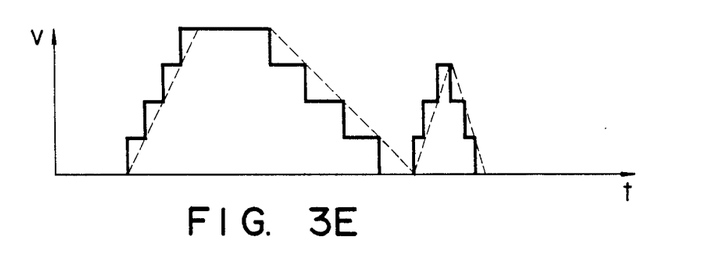

On the other hand, bias voltage is applied between the position measuring probe 22 and the reference sample 26 through a power source V2 and tunnel current is thus caused to flow between them. There will be described a case where a sample having such a surface as shown in FIG. 3A is scanned from left to right in FIG. 3A at a certain speed by the probe. The tunnel current flowing between the position measuring probe 22 and the reference sample 26 is converted to voltage by a current/voltage converter 111. The converted voltage is amplified by an amplifier 112. FIG. 3B shows a time chart for outputs applied from the amplifier 112. Signal once applied from the amplifier 112 through a capacity every cycle of the concave and convex on the surface of the reference sample 26 is converted to a normalized pulse by a filter circuit 113. FIG. 3C shows a time chart for these normalized pulses. The normalized pulse applied from the filter circuit 113 is input into an input terminal of a multiplier circuit 114. The output from the comparator circuit 115 or signal representing the polarity of the probe 14 moving along the Z axis is applied to another input terminal of the multiplier circuit 114. FIG. 3D shows a time chart for these signals. The two signals applied to the input terminals of the multiplier circuit 114 are multiplied there and pulse signal which represents the moving direction of the first piezo-actuator 16 by its pulse polarity and which also represents the moving distance of the first piezo-actuator 16 by its pulse number per a unit time is output from the multiplier circuit 114. The pulse signal is accumulated in time series by an accumulator circuit 116 and signals for reproducing the shape of the surface of the sample are thus output from the accumulator circuit 116. FIG. 3E shows a time chart for signals applied from the accumulator circuit 116. Broken lines in FIG. 3E show the concaved and convexed surface of the sample. Stepped waveforms which are represented by signals applied from the accumulator circuit 116 are largely shifted from the shape of the surface of the sample but this is because the time axes in the time charts shown in FIGS. 3B through 3E are roughly plotted. The time axes in the time charts are practically plotted in micro-size so that a waveform for reproducing the shape of the surface of the sample accurately can be obtained.

According to the scanning tunneling microscope of the present invention, the displaced amount or distance of the probe 14 which scans the surface of the sample 12 is imagined not from voltage applied to the drive electrodes for the first piezo-actuator 16 but from the waveforms of tunnel current applied when the position measuring probe 22 moves up and down along the surface of the reference sample 26, following the first piezo-actuator 16 moved. Therefore, the expanded and contracted amount of the first piezo-actuator 16 can be correctly and accurately determined without being influenced by hysteresis, creep phenomenon and interatomic force.

Figure 4:
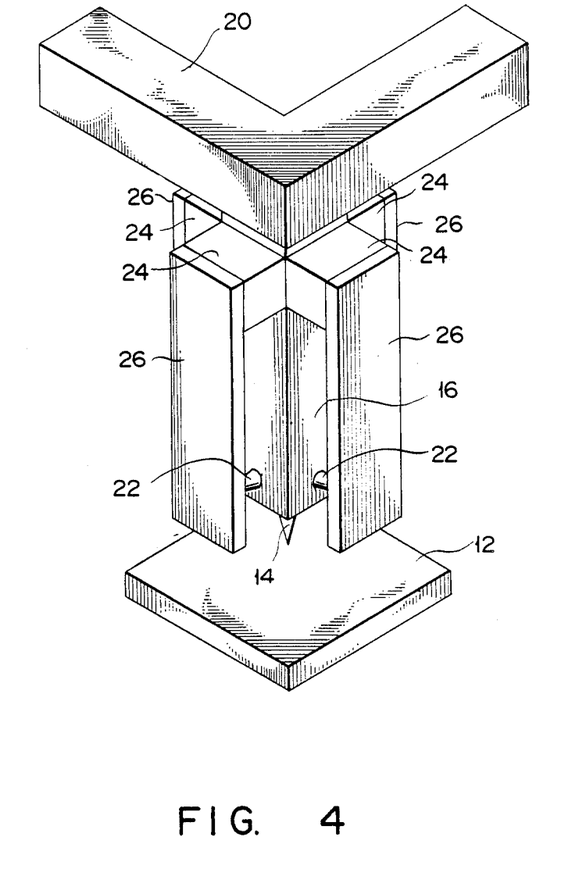
FIG. 4 shows another embodiment of the piezo-actuator provided with the micro-displacement detector device according to the present invention.

FIG. 4 shows another embodiment of the piezo-actuator used by the scanning tunneling microscope of the present invention. The piezo-actuator 16 of rectangular parallelepiped expansible and contractable in a direction (or direction Z) perpendicular to the surface of the sample 12 is provided with the scanning probe 14 on the bottom thereof which is separated from the surface of the sample 12 by a certain distance to observe the surface of the sample 12. The top of the piezo-actuator 16 is fixed to the drive system 20, which drives the piezo-actuator 16 in the direction X - Y to move the scanning probe 14 parallel to the surface of the sample 12. The piezo-actuator 16 also has the position measuring probes 22 each projected from the lower end of each of the four sides of the piezo-actuator 16. Only the two probes 22 are shown in FIG. 4 but the remaining two are naturally projected from the remaining two sides of the piezo-actuator 16. The piezo-actuator 16 further includes the reference samples 26 each fixed to the upper end of each of the four sides of the piezo-actuator 16 through the piezo-actuator 24 and opposed to its corresponding probe 22. Each of the reference samples 26 is separated from its corresponding probe 22 by a certain distance and has concaves formed at a predetermined interval or pitch on that surface thereof which is opposed to its corresponding probe 22, as seen in the first embodiment of the present invention. The position measuring circuit similar to the one in the first embodiment of the present invention is arranged between each of the position measuring probes 22 and its corresponding reference sample 26. The operation of the position measuring circuit will be omitted because it has been described above.

When the surface of the sample 12 is to be observed, bias voltage is applied between the position measuring probes 22 and their corresponding reference samples 26. Each position measuring probe 22 moves parallel to the concaved surface of its corresponding reference sample 26 by a distance equal to the distance by which the scanning probe 14 moves along the configuration of the surface of the sample 12. Tunnel current having the waveform for reproducing the concaved surface of the reference sample 26 is detected this time by a tunnel current detector As the pitch of the concaves on the surface of the reference sample 26 is already known, the distance by which the scanning probe 14 moves in the direction Z can be obtained from the waveform of tunnel current detected or number of those concaves on the reference sample 26 which are crossed by the position measuring probe 22.

In the case of this second example according to the present invention, four waveforms of tunnel currents which reproduce the shapes of the surfaces of the four reference samples 26 crossed by the position measuring probes 22 can be obtained when the scanning probe 14 moves along the surface of the sample 12 and the displaced distance of the probe 14 can be determined by these four waveforms of tunnel currents detected. It can be made clear therefore from the difference between two tunnel currents output from those two position measuring probes 22 which are on the two opposite sides of the piezo-actuator 16 how the piezo-actuator 16 is curved in the direction Z. This enables the displaced amount or distance of the probe 14 to be obtained with a higher accuracy. When the displaced distances or amounts of the four position measuring probes 22 are corrected by one another, therefore, the expanded and contracted distance or amount of the piezo-actuator 16 can be measured with a higher accuracy but without including any error which is caused by the piezo-actuator 16 curved by the atomic force and the like.

Figure 5:
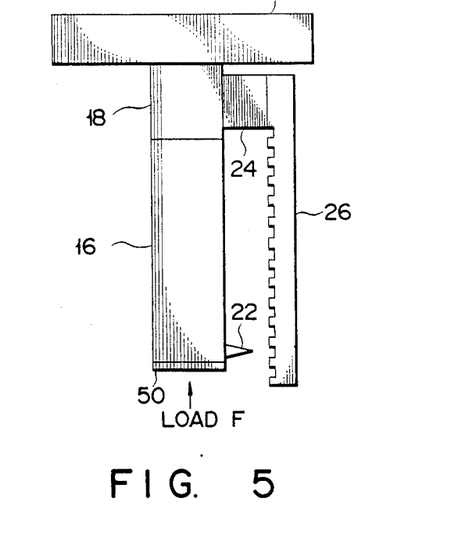
FIG. 5 shows a further embodiment of the piezo-actuator provided with the micro-displacement detector device according to the present invention.

FIG. 5 shows a further embodiment of the piezo-actuator 16 wherein a plate-like member 50 is used instead of the probe 14. This embodiment can also use the position detecting circuit shown in FIG. 3 and the movement of the probe 22 relative to the reference sample 26 can be measured on the basis of outputs applied from the accumulator circuit 116. When voltage is applied to electrodes (not shown) by a drive power source (not shown), the piezo-actuator 16 is expanded against force F added to the plate-like member 50. The length by which the piezo-actuator 16 is expanded can be detected responsive to signals output from the accumulator circuit 116 and if the drive voltage applied to the electrodes when the piezo-actuator 16 is expanded to a desired distance is held as it is, load can be moved by a desired distance.

Figure 6:
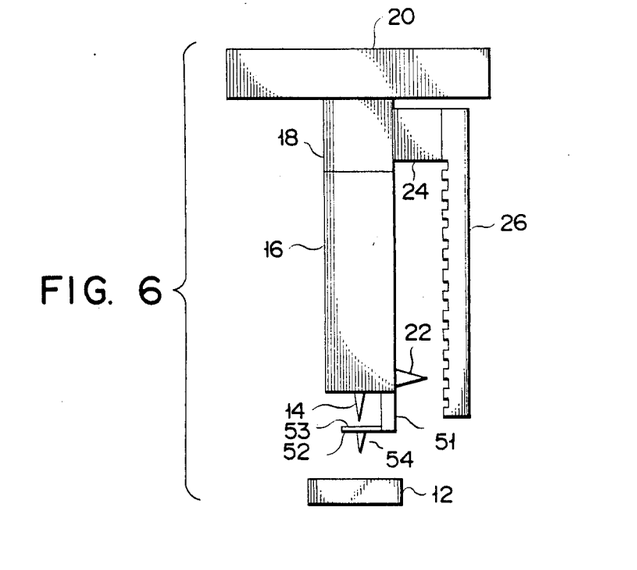
FIG. 6 shows a still further embodiment of the piezo-actuator provided with the micro-displacement detector device according to the present invention.

FIG. 6 shows a case where the detector section used in AFM is provided at the piezo-actuator 16 of FIG. 1. The probe 14 is opposed in this case to a conductive face 53 of a cantilever 52 with an interval of several Å interposed between them, said cantilever 52 being supported by a piezo-element body 51 which is fixed to the underside of the piezo-actuator 16 provided with the probe 14. The cantilever 52 is also provided with an AFM probe 54 projected from the underside thereof. The positioning of the AFM probe 54 and the sample 12 can be determined in this case by tunnel current detected between the probe 14 and the conductive face 53 of the cantilever 52. In other words, the sample 12 shown in FIG. 2 is replaced by the conductive face 53 of the cantilever 52. As the detector section has the AFM arrangement in this case, the surface of a sample which is not conductive can be viewed. When the AFM probe is replaced by a magnet sensing probe which is coated with Ni, the surface of a sample which is made of magnetic material can be observed.

A combination of atomic structure and concaves and convexes formed according to the lithographic technique can be used as the scale on that surface of the reference sample which is opposed to the probe. For example, the integer of pitches of graphite lattice is detected and an artificial pattern desirably concaved and convexed according to the lithography may be added to this graphite lattice. When the artificial pattern has concaves and convexes of several 10–100 Å and the probe 22 is set relative to the surface of the reference sample 26 at a distance substantially close to the longest which enables tunnel current to be detected, the probe can be prevented from colliding with the surface of the reference sample even if it is moved in the direction Z at a relatively high speed, and measurement becomes possible by roughly moving the probe to near a setpoint. The probe is then moved on micro-basis to the graphite lattice to come a distance of several Å near the surface of graphite. Measurement of high resolution can be thus realized.

Further, matters having atomic structure have a pattern of long cycle which is called CDW. When this pattern is used, a combined scale similar to the above-mentioned one can be formed without processing these matters. Or matters whose electric conduction rate is changed by a predetermined light radiated can be used as the reference sample.

The pitch of lattice depends upon the bonding rule of component atoms and can be easily converted to an MSK unit, using the computer.

Depending upon the kind of reference samples used, it is sometimes difficult to use them as the scale because their component atoms adsorb oxygen and the like. They can be refreshed in this case by applying current to them to remove matters absorbed from them.

Additional advantages and modifications will readily occur to those skilled in the art. Therefore, the invention in its broader aspects is not limited to the specific details, and representative devices shown and described. Accordingly, various modifications may be made without departing from the spirit or scope of the general inventive concept as defined by the appended claims and their equivalents.

What is claimed is:

1. A micro-displacement detector device comprising:
   a reference sample having a face of which property changes along the face;
   a probe located adjacent to the reference sample and moved along the face of the reference sample; and
   means for measuring a property change between the probe and the face of the reference sample to detect the displacement of the probe relative to the face of the reference sample.

2. The micro-displacement detector device according to claim 1, wherein the property changes of the face of said reference sample include changes of conductive state, and the displacement detector means includes means for applying a bias voltage between the probe and the reference sample and means for detecting tunnel curent flowing between the probe and the reference sample when the bias voltage is applied between them.

3. The micro-displacement detector device according to claim 1, wherein the reference sample is located on the free end portion of a cantilever, the cantilever is attached to a probe supporting member through a piezo-element body, and said displacement detector means has the piezo-element body for supporting the cantilever.

4. The micro-displacement detector device according to claim 1, wherein the property changes of the face of said reference sample include concaves and convexes formed on the face thereof which are arranged at a predetermined interval and these concaves and convexes are those atoms which are present on the face of the reference sample.

5. In a piezo-actuator comprising a piezo-element body and a pair of electrodes which hold the piezo-element body between them wherein said piezo-element body is expanded and contracted in a predetermined direction when voltage is applied between the electrodes, the improvement which further includes a micro-displacement detector device comprising a reference sample having a face of which property changes along the face, a probe located adjacent to the reference sample and moved along the face of the reference sample, and means for detecting the displacement of the probe relative to the face of the reference sample.

6. The piezo-actuator according to claim 5, wherein said reference sample is supported on the fixed end side of the piezo-element body and parallel to the direction in which the piezo-element body is expanded or contracted, and said probe is located on the free end side of the piezo-element body and perpendicular to the direction in which the piezo-element body is expanded or contracted, so that the displacement of the probe can be measured by detecting the probe which is moved on the reference sample when the piezo-element body is expanded or contracted.

7. A scanning probe microscope comprising:
   a first probe for observing the surface of a sample;
   one or more second probes extending in a direction perpendicular to the first probe;
   a piezo-actuator for supporting the first and the second probes and moving them in a direction vertical to the surface of said sample without changing their positional relation;
   a reference sample having a face on which concaves and convexes are formed at predetermined intervals, and supported with this face directed perpendicular to the second probe;
   means for applying bias voltage between the first probe and the sample to detect tunnel current flowing between them; and
   means for applying bias voltage between the second probe and the reference sample to detect tunnel current flowing between them so as to measure the displacement of the first probe on the basis of the concaves and convexes on the face of said reference sample.

8. The scanning probe microscope according to claim 7, wherein the second probes included are two or more.

* * * * *